US008200457B2

(12) United States Patent  (10) Patent No.: US 8,200,457 B2
Axling et al.  (45) Date of Patent: Jun. 12, 2012

(54) CUSTOMIZING OF COMPUTER AIDED DESIGN MODELS

(75) Inventors: Tomas Axling, Stockholm (SE); Klas Orsvarn, Sollentuna (SE)

(73) Assignee: Tacton Systems AB, Stockholm (SE)

( * ) Notice: Subject to any disclaimer, the term of this patent is extended or adjusted under 35 U.S.C. 154(b) by 668 days.

(21) Appl. No.: 12/109,590

(22) Filed: Apr. 25, 2008

(65) Prior Publication Data

US 2008/0234991 A1    Sep. 25, 2008

Related U.S. Application Data

(63) Continuation-in-part of application No. 11/205,941, filed on Aug. 17, 2005, now Pat. No. 7,457,789.

(51) Int. Cl.
*G06F 17/50* (2006.01)
*G06G 7/48* (2006.01)

(52) U.S. Cl. ............................ 703/1; 703/6
(58) Field of Classification Search .................. None
See application file for complete search history.

(56) References Cited

U.S. PATENT DOCUMENTS 6,223,170 B1 *  4/2001  Skovgaard ............... 706/47
7,698,402 B2 *  4/2010  Santos et al. ............. 709/223
2002/0156698 A1  10/2002  Machau et al.
2003/0204823 A1 * 10/2003  Armstrong et al. ....... 716/2
2005/0071135 A1  3/2005  Vredenburgh et al.

FOREIGN PATENT DOCUMENTS

WO    WO 02/37339 A2    5/2002

* cited by examiner

*Primary Examiner* — David Silver
(74) *Attorney, Agent, or Firm* — Alston & Bird LLP

(57) ABSTRACT

A CAD model customized, which represents a mechanical design of an artifact comprising a set of parts with respective dimensions. A configuration model defines an exhaustive range of ways to customize the CAD model by changing a subset the dimensions. A model translation module is arranged to convert the configuration model into: (i) a CSP representing all possible customizations defined by the configuration model, the CSP is defined by: (a) set of integer variables, wherein each variable may attain a finite number of different values, and (b) a set of constraints restricting which variable values that are simultaneously possible for the variables, (ii) a set of CSP variable-dimension pairs, and (iii) a set of CSP variable-parameter pairs. A configuration engine is arranged to: calculate a solution to the CSP, which solution is optimal with respect to a value assigned to each variable in the CSP relative to a predefined optimizing criterion, and assign a parameter value for each CSP variable-parameter pair, the allocated parameter value corresponding to the value assigned to the CSP variable in the optimal solution. A CAD interface is arranged to assign a dimension in the CAD model for each CSP variable-dimension pair, where the assigned dimension corresponds to a value assigned to the CSP variable in the optimal solution.

21 Claims, 7 Drawing Sheets

CUSTOMIZING OF COMPUTER AIDED DESIGN MODELS

CROSS-REFERENCE TO RELATED APPLICATIONS

This application is a continuation-in-part of U.S. patent application Ser. No. 11/205,941, filed on Aug. 17, 2005, now U.S. Pat. No. 7,457,789, issued Nov. 25, 2008, which is incorporated herein by reference in its entirety.

THE BACKGROUND OF THE INVENTION AND PRIOR ART

The present invention relates generally to Computer Aided Design (CAD) systems. More particularly the invention relates to a system for customizing a CAD model representing a mechanical design of an artifact. It is here presumed that the artifact contains a set of parts with respective dimensions, and that a configuration model defines an exhaustive range of ways to customize the CAD model. Specifically, the customization involves changing a subset of the dimensions in the set of parts.

The invention also relates to a method of customizing a CAD model, a computer program product and a computer readable medium.

CAD systems for mechanical engineering have existed for many decades. In this document, the term "CAD system" is based on a 3-dimensional (3D) model of a product geometry. Hence, a CAD model of a mechanical product is an assembly of parts, where each part has a 3D shape defined by solid features with various dimensions. The parts and the assembly can be modeled to a level of detail, which is sufficient for precision fabrication of the parts and the assembly, and to predict their physical behavior. Pro/ENGINEER by Parametric Technology Corporation (www.ptc.com), SolidWorks and CATIA by Dassault Systèmes (www.3ds.com), and Inventor by AutoDesk (www.autodesk.com) represent 3D-CAD systems for mechanical engineering to which the present invention is applicable. These systems also provide direct integrations to Computer Aided Manufacturing (CAM) systems, which renders it possible to automatically fabricate physical artifacts according to the 3D-CAD model, e.g. by using Computer Numerically Controlled (CNC) machines. Generally, the accuracy of a 3D-CAD model is also sufficient for computer software to calculate accurate predictions of the physical behavior of the corresponding physical artifact.

CAD models are created by engineers using the CAD systems. Thus, an engineer may generate the model by defining all the features and dimensions of all the parts included, and define how these elements shall be assembled into a product. Preferably, the system also allows the engineer to include parts, or sub-assemblies, that have already been defined in a CAD system by other parties.

Usually, there is a need to customize an existing CAD model. For example, different users of the physical artifact may require a respective customized version of the artifact, which is adapted to their specific use of the artifact. The customization may be accomplished manually by a designer, through a modification of the CAD model, e.g. by changing some of the dimensions of a number of the parts in the CAD model, by replacing parts with other alternative parts with other characteristics, and/or by suppressing or unsuppressing parts therein (i.e. revealing parts having been temporarily hidden). For instance, in a CAD model, a dimension may be the distance between two points, an angle, or a coordinate system position. Traditionally, CAD systems have had the ability to perform such changes with a high degree of automation. If a dimension is changed, or a part is replaced, the remainder of the CAD model and the associated drawings can be automatically updated by the CAD system, and a 3D image of the customized product is automatically rendered. This allows the user to browse the 3D image and review that the changes are correct.

However, normally, a large number of changes are required in order to customize the CAD model as desired. Moreover, there may be a vast number of dependencies between such changes. This means that there is a relatively large risk that a combination of changes results in a CAD model of a product, which cannot be assembled or that will not work properly. These difficulties render it a very time consuming process for the designer to manually customize the CAD model correctly.

As an attempt to address these difficulties, many of today's CAD systems have built-in programming tools for enabling a program to be designed, which program automatically performs all the changes needed to customize the CAD model based on a predefined form. Hence, a customer's requirements can be captured in terms of a set of predefined parameters with a finite set of possible values. These programming tools utilize what we herein call a "CAD interface", which is provided by the CAD system, a so-called Application Programming Interface (API). This interface renders it possible for a program to perform the same type of changes as a designer can make manually (i.e. having the same automatic update of the CAD model, and allowing the designer to review the changes directly in the CAD system as if he had made the modifications manually). In addition to built-in programming tools, there are also third party vendors, such as DriveWorks (www.driveworks.co.uk) and RuleStream (www.rulestream.com) offering solutions for programming the customization of CAD models using the CAD interface.

The existing solutions for automatically customizing a CAD model often allow the user to define a procedure of rules for customizing the design based on predefined parameters, which can be entered by the designer running the procedure in order to define the specific customer requirements for customization. However, this is disadvantageous because (a) it is very difficult to define a procedure which will always comply with the dependencies between the changes prescribed by the procedure, and which also represents an optimal customization of the product for the specific customer requirements; and (b) the designer running the procedure to automate his/her customization work must follow the same sequence of entering parameters to define the specific customer requirements. This causes difficulties for the designer when make trade-offs between incompatible parameter value choices. Furthermore, the designer must enter values for all parameters even though a subset of these parameters may be unspecified by the customer. This, in turn, means that it is an intricate task for the designer to customize the product in an optimal manner.

The published U.S. Patent Application No. 2005/0071135 describes a knowledge management system for CAD modeling, wherein rules for modeling geometric objects are applied. The published U.S. Patent Application No. 2002/0156698 discloses a process for configuring products on a personal computer. Here, a designer may use menus to select components to be included in a given product.

Although the solutions described in these references may be advantageous for various reasons, none of the documents describes or proposes modifying the CAD model based on a formal constraint satisfaction approach. The known solutions cannot guarantee that the resulting CAD model is globally optimal in respect of a predefined criterion either.

SUMMARY OF THE INVENTION

The object of the present invention is therefore to provide a straightforward and flexible solution for customizing a CAD model, which alleviates the above problems and thus offers an efficient and highly user-friendly CAD tool.

According to one aspect of the invention, the object is achieved by a system for customizing a CAD model representing a mechanical design of an artifact. The artifact includes a set of parts with respective dimensions, and a further configuration model defines an exhaustive range of ways to customize the CAD model by changing a subset of the dimensions. The proposed system includes a model translation module, a configuration engine and a CAD interface. The model translation module is arranged to convert the configuration model into: (i) a constraint satisfaction problem (CSP) representing all possible customizations defined by the configuration model (the CSP, in turn, is defined by: (a) set of integer variables, wherein each variable may attain a finite number of different values, and (b) a set of constraints restricting which variable values that are simultaneously possible for the variables in the set of variables), (ii) a set of CSP variable-dimension pairs, and (iii) a set of CSP variable-parameter pairs. The configuration engine is arranged to calculate a solution to the CSP, such that the calculated solution is optimal with respect to a value assigned to each variable in the CSP relative to a pre-defined optimizing criterion. The configuration engine is also arranged to assign a parameter value for each CSP variable-parameter pair, where the allocated parameter value corresponds to the value assigned to the CSP variable in the optimal solution. The CAD interface is arranged to assign a dimension in the CAD model for each CSP variable-dimension pair, where the assigned dimension corresponds to a value assigned to the CSP variable in the optimal solution derived by the configuration engine.

This system is advantages because the CSP-based configuration tool is integrated tightly into the CAD system via the CAD interface of the CAD system. This, in turn, enables the designer to enter parameter values in any sequence, e.g. based on an order of importance for the customer. Moreover, an optimal solution can always be presented to the designer, where the solution is based on the parameter values entered so far.

Furthermore, the invention allows the dependencies between design changes, as well as the dependencies between parameter values and the design changes to be defined explicitly, for instance as mathematical and/or logical relations between design choices. Hence, there is no need to define a sequence of rules to be executed in a procedure. Implicitly, this guarantees that the design will comply with the dependencies. The proposed CSP based configuration engine is arranged to automatically find a customization solution, which is compliant with the dependencies between design choices in the product. This is highly advantageous because each dimension may have a range of millions of possible values. Consequently, the number of possible customizations may be extremely large. Nevertheless, a CSP based configuration engine is capable of handling this kind of complexity very well.

According to one preferred embodiment of this aspect of the invention, the configuration engine is further arranged to, for each CSP variable-parameter pair; derive a set of possible values compatible with the set of constraints. Hence, ranges of all valid alternative parameter values can be presented to the designer at all times.

According to another preferred embodiment of this aspect of the invention, the system further includes a user interface module. This module is arranged to receive a user-generated input defining a parameter as committed to a particular value of the set of possible values for the parameter. The user interface module is also arranged to cause presentation of ranges of possible parameter values that are compatible with the at least one committed parameter. Thereby, the designer may be provided with immediate feedback pertaining to the effects of fixating one or more parameters in the design.

According to yet another preferred embodiment of this aspect of the invention, the configuration engine is further arranged to calculate an updated optimal solution to the CSP based on at least one committed parameter. In response thereto, the CAD interface is arranged to assign an updated dimension in the CAD model for each CSP variable-dimension pair, where the assigned updated dimension corresponds to the value assigned to a CSP variable in the updated optimal solution. The CAD interface is likewise arranged to cause presentation of updated allocated parameter values corresponding to the values assigned to the CSP variables in the updated optimal solution, and cause presentation of ranges of possible parameter values compatible with the set of constraints relative to the at least one committed parameter. Thereby, the designer may conveniently realize the effects caused by committing one or more parameters in the design to certain values.

According to still another preferred embodiment of this aspect of the invention, it is presumed that at least one part in the CAD model is replaceable with a part from a respective set of at least one alternative part. The replaceable part here corresponds to a CSP variable that has a first integer value, and each of the at least one alternative part corresponds to a respective second integer value of the CSP variable. The configuration engine is arranged to assign the second integer value of the CSP variable via the optimal solution, i.e. if the optimal solution implies selecting a given alternative part this part will be included in the resulting CAD model.

According to a further preferred embodiment of this aspect of the invention, the model translation module is additionally arranged to convert the configuration model into a hierarchy having nodes. These nodes contain said CSP variables and parts of the CAD model. Moreover, at least one node defines at least one of its CSP variables as a state variable whose value may be either one or zero. The configuration engine is here further arranged to, for each node; investigate if there is a state variable. If so, and if the value assigned to the state variable in the optimal solution is equal to zero, the configuration engine is arranged to cause suppression of the parameters associated with CSP variables in the node containing the state variable, as well as parameters associated with CSP variables in any nodes descending from this node. Each node which is associated with a suppressed CSP variable is defined as a suppressed node. The CAD interface is further arranged to, for each node; investigate if there is a state variable. If so, and if the value assigned to the state variable in the optimal solution is equal to zero, the CAD interface is arranged to cause suppression of the CAD parts in the node itself, and any CAD parts descending from this node. Consequently, logic behind what is shown in the CAD model may be simplified significantly.

According to another preferred embodiment of this aspect of the invention, the CAD interface is arranged to: update the CAD model based on the suppressed nodes, cause presentation of the updated CAD model, and cause presentation of ranges of possible parameter values compatible with the set of constraints relative to the updated CAD model. Thus, if the CAD model is simplified, this can be shown to the designer.

According to another aspect of the invention the object is achieved by a method of customizing a CAD model representing a mechanical design of an artifact comprising a set of parts with respective dimensions. It is assumed that a configuration model defines an exhaustive range of ways to customize the CAD model by changing a subset of said dimensions. The method involves the steps of: converting the configuration model into: (i) a CSP representing all possible customizations defined by the configuration model, the CSP being defined by: (a) set of integer variables, wherein each variable may attain a finite number of different values, and (b) a set of constraints restricting which variable values that are simultaneously possible for the variables in the set of variables, (ii) a set of CSP variable-dimension pairs, and (iii) a set of CSP variable-parameter pairs; calculating a solution to the CSP, which solution is optimal with respect to a value assigned to each variable in the CSP relative to a predefined optimizing criterion; and assigning a parameter value for each CSP variable-parameter pair, where the allocated parameter value corresponds to the value assigned to the CSP variable in the optimal solution; and assigning a dimension in the CAD model for each CSP variable-dimension pair, where said assigned dimension corresponds to a value assigned to the CSP variable in the optimal solution.

The advantages of this method, as well as the preferred embodiments thereof, are apparent from the discussion hereinabove with reference to the proposed system.

According to a further aspect of the invention the object is achieved by a computer program product, which is directly loadable into the internal memory of a computer, and includes software for controlling the above proposed method when said program is run on a computer.

According to another aspect of the invention the object is achieved by a computer readable medium, having a program recorded thereon, where the program is to control a computer to perform the above-proposed method.

Due to the tight integration of the proposed configurator and the CAD system, the designer may, at any time while in the process of customizing the design, see in the CAD system what the design looks like, and perform various kinds of performance analyses in the CAD system, such as collision detections, simulations of physical behavior, etc. Based on those analysis results, the designer may then decide to change a parameter value. Such a change, in turn, may be visualized and analyzed directly in the CAD system. Thereby, the designer may determine how the change in question affects the overall design of the product. Moreover, the designer can use his/her familiar design tool, and perform any manual changes to the CAD model (e.g. to meet customer requirements, which have not been anticipated in the rules for customizing the product). Subsequently, the designer may continue using the configurator according to the invention to make further customizations defined by the configuration model of the proposed configurator. In addition, the resulting CAD model is available for CAM in CNC machines etc. Because the CAD system is capable of automatically updating all aspects of the CAD model based on a few changes of dimensions and parts, there is no need to have ready-made 3D models of all the possible parts in a customized CAD model. Instead, the configuration model only needs to reference those changes that would otherwise have to be made manually.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED EMBODIMENTS OF THE INVENTION

Figure 1:
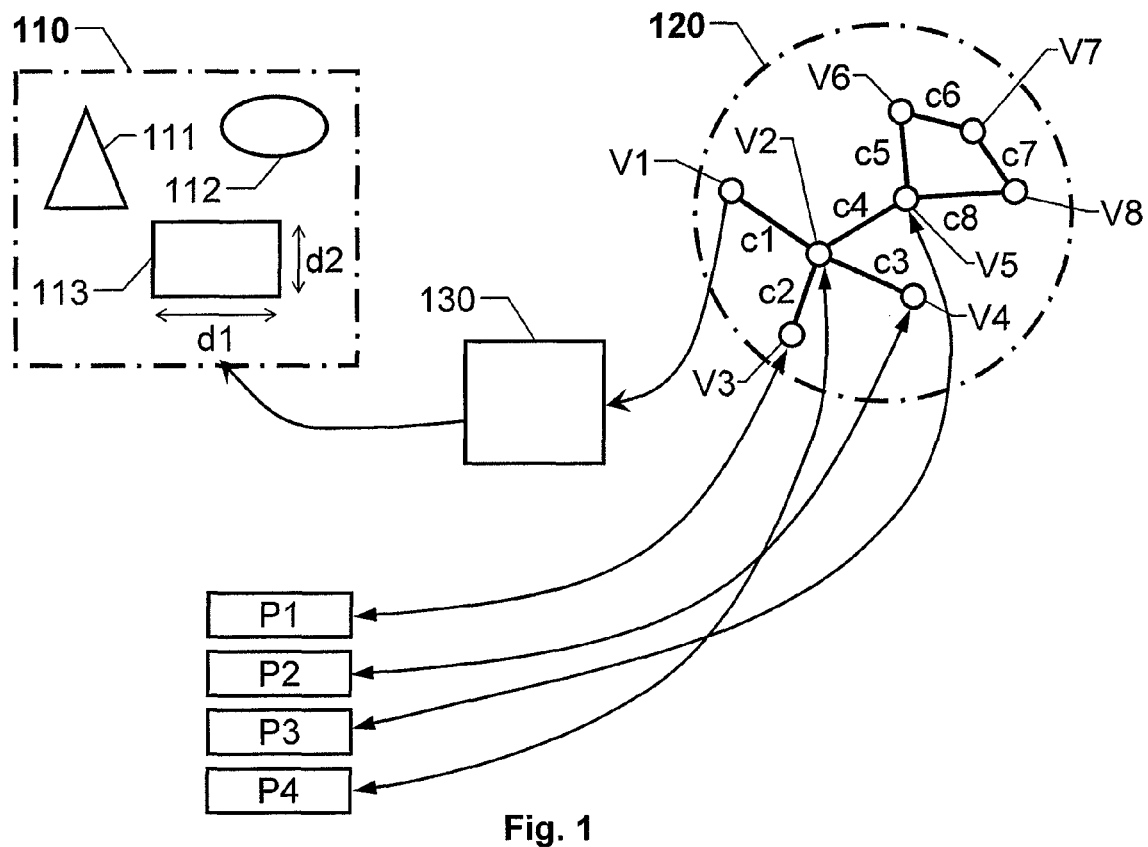
FIG. 1 schematically illustrates how a CAD model may be customized based on a CSP according to the invention.
Figure 2:
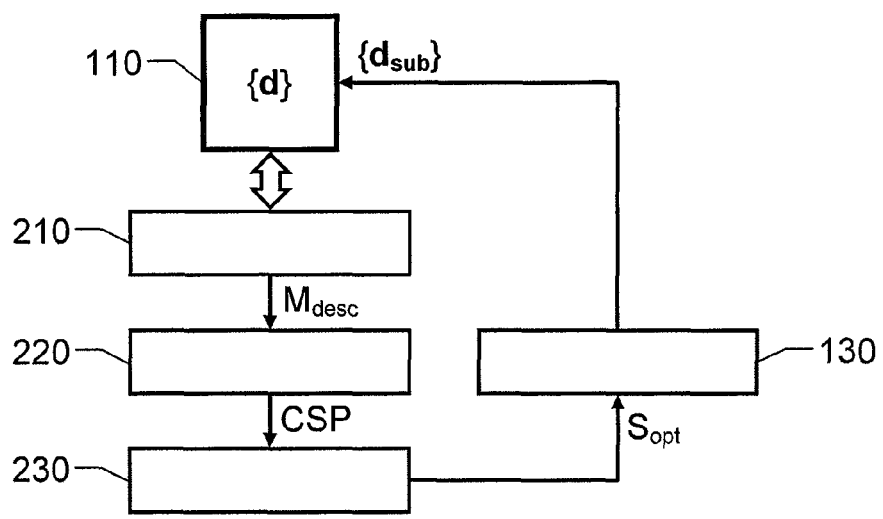
FIG. 2 shows a block diagram over a system according to one embodiment of the invention.

We refer initially to FIG. 1, which schematically illustrates how a CAD model 110 may be customized based on a CSP 120 according to the invention. We also refer to FIG. 2, showing a block diagram over a system according to one embodiment of the invention.

The CAD model 110 represents a mechanical design of an artifact, which in turn, includes a set of parts 111, 112 and 113 with respective dimensions $\{d\}$. Here, first and second dimensions d1 and d2 are explicitly illustrated for a rectangular part 113 in the set of parts. A configuration model 210 defines an exhaustive range of ways as to how the CAD model 110 may be customized by changing a subset $\{d_{sub}\}$ of said dimensions $\{d\}$. In this example, we assume that it is at least possible to thus change the first and second dimensions d1 and d2 (i.e. $\{d_{sub}\}$ contains d1 and d2). The proposed system includes a model translation module 220, a configuration engine 230 and a CAD interface 130.

The model translation module 220 is arranged to convert the configuration model 210 into: (i) a CSP 120 (ii) a set of CSP variable-dimension pairs (here V2-P4, V3-P1, V4-P2 and V5-P3 respectively), and (iii) a set of CSP variable-parameter pairs. The CSP 120 represents all possible customizations defined by the configuration model 210. The CSP 120 is defined by: (a) set of integer variables V1, V2, V3, V4, V5, V6, V7 and V8, wherein each variable may attain a finite number of different values, and (b) a set of constraints c1, c2, c3, c4, c5, c6, c7 and c8 respectively restricting which variable values that are simultaneously possible for the variables V1, V2, V3, V4, V5, V6, V7 and V8 in the set of variables.

The configuration engine 230 is arranged to calculate a solution $S_{opt}$ to the CSP 120, where the calculated solution $S_{opt}$ is optimal with respect to a value assigned to each variable V1, V2, V3, V4, V5, V6, V7 and V8 in the CSP 120 relative to a predefined optimizing criterion. The configuration engine 230 is also arranged to assign a parameter value for each CSP variable-parameter pair V2-P4, V3-P1, V4-P2 and V5-P3, where the allocated parameter value corresponds to the value assigned to the CSP variable V1, V2, V3, V4, V5, V6, V7 and V8 in the optimal solution $S_{opt}$.

The CAD interface 130 is arranged to assign a dimension in the CAD model 110 for each CSP variable-dimension pair.

The assigned dimension in the CAD model 110 here corresponds to a value assigned to the CSP variable V1, V2, V3, V4, V5, V6, V7 and V8 in the optimal solution $S_{opt}$. Specifically, in this example, a first CSP variable V1 corresponds to the first dimension d1, i.e. the V1 value assigns d1.

Figure 3:
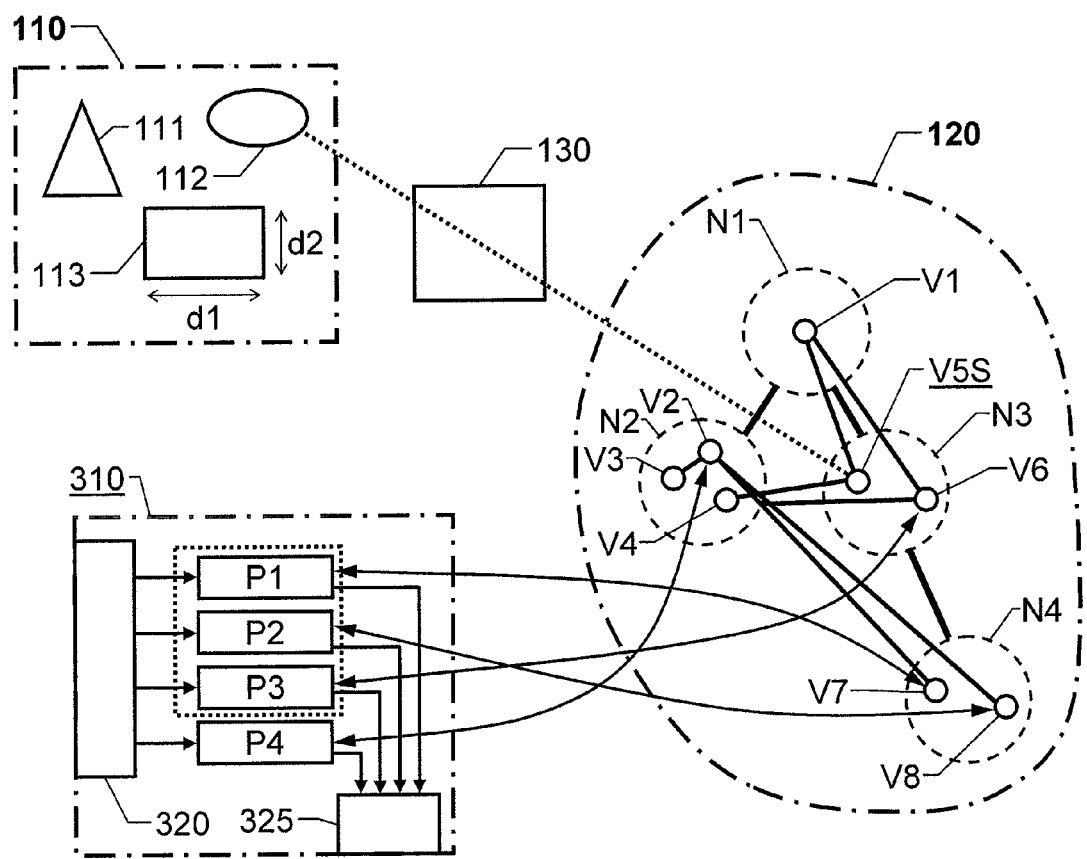
FIG. 3 schematically illustrates how a CAD model may be customized based on a CSP according to one embodiment of the invention.

FIG. 3 schematically illustrates how a CAD model 110 may be customized based on a CSP 120 according to one embodiment of the invention.

Here, the model translation module 220 is further arranged to convert the configuration model 210 into a hierarchy having nodes N1, N2, N3 and N4 respectively. The nodes N1, N2, N3 and N4 contain the CSP variables V1, V2, V3, V4, V5S, V6, V7 and V8 and parts of the CAD model 110.

In this example, one CSP variable V5S in a node N3 is defined as a state variable whose value may be either one or zero. For each node N1, N2, N3, and N4 in the CSP 120, the configuration engine 230 is arranged to investigate if there is a state variable. For each node having a state variable (i.e. here the node N3), the configuration engine 230 is arranged to check the value of the state variable (i.e. here V5S), and if the assigned value in the optimal solution $S_{opt}$ is equal to zero, the configuration engine 230 causes suppression of the parameters associated with CSP variables V5S and V6 in the node N3 containing that variable V5S. Additionally, the configuration engine 230 causes suppression of the parameters associated with CSP variables V7 and V8 in any nodes N4 descending from the node in which the zero-valued state variable is located. Each node which is associated with a suppressed CSP variable is defined as a suppressed node.

In this example, provided that V5S=zero, the parameters P1, P2 and P3 are all suppressed because P1 and P2 are associated with the CSP variables V7 and V8 respectively in the node N4 descending from the node N3, and the parameter P3 is suppressed because its associated CSP variable V6 is located in the node N3 containing the zero-valued state variable V5S.

However, of course, if instead the state variable V5S has the value one, none of the parameters P1, P2, P3 or P4 is suppressed in this example.

According to the embodiment of the invention illustrated in FIG. 3, for each node N1, N2, N3 and N4, the CAD interface 130 is further arranged to investigate if there is a state variable (i.e. here V5S in the node N3), and if the value assigned to the state variable V5S in the optimal solution $S_{opt}$ is equal to zero, the CAD interface 130 causes suppression of the CAD parts in that node N3, as well as any CAD parts descending from the node N3. Here, we assume that the node N3 contains the CAD part 112 (illustrated by means of a dotted line in FIG. 3). Thus, if V5S=zero, the CAD interface 130 suppresses the CAD part 112 in the resulting CAD model 110.

Preferably, to this aim, the CAD interface 130 is arranged to: update the CAD model 110 based on the suppressed nodes N3 and N4, cause presentation of the updated CAD model 110, and cause presentation of ranges of possible parameter values compatible with the set of constraints relative to the updated CAD model 110. For reasons of clarity, in FIG. 3 the constraints are merely shown as lines (without labels) interconnecting specific CSP variables V1, V2, V3, V4, V5S, V6, V7 and V8.

It is advantageous if a user interface module 310 is included, which is arranged to receive a user-generated input for influencing the values of one or more of the parameters P1, P2, P3 and P4. To this aim, the user interface module 310 may include input means 320 in the form of a keyboard, a touch screen etc. It is further advantageous if the user interface module 310 includes output means 325 (e.g. a display) arranged to cause presentation of ranges of possible values for the parameters P1, P2, P3 and P4.

Again, if there is no state variable in the optimal solution $S_{opt}$, or if the state variables of the optimal solution $S_{opt}$ are all equal to one, no parameters or CAD parts are suppressed.

Figure 4A:
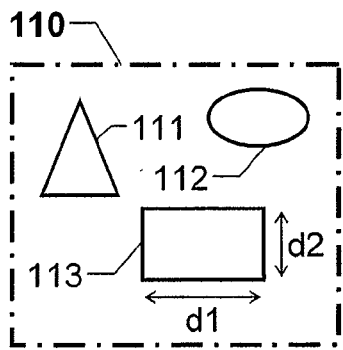
FIGS. 4a-b schematically illustrate how a user may commit a parameter to a particular value according to one embodiment of the invention.
Figure 4A:
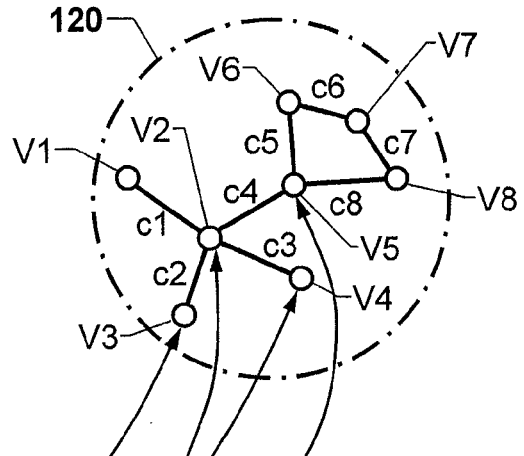
Figure 4A:
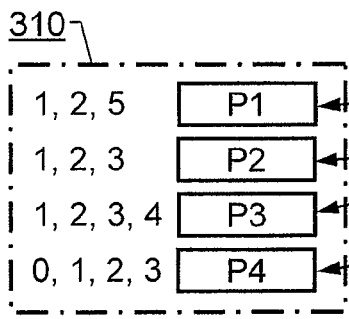
Figure 4B:
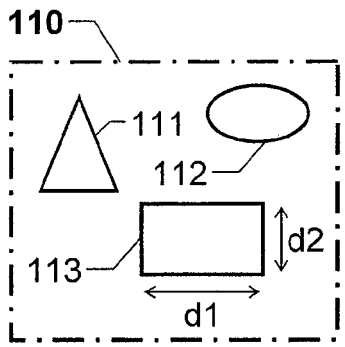
Figure 4B:
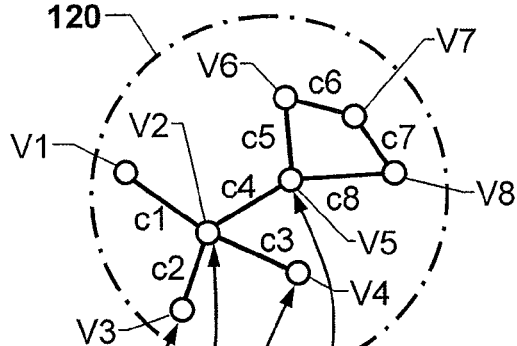
Figure 4B:
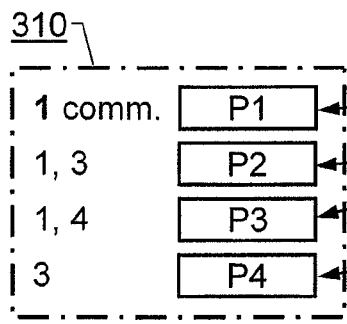

FIGS. 4a and 4b schematically illustrate how a parameter P1 can be committed to a particular value in response to a user-input according to one embodiment of the invention.

Here, the configuration engine 230 is further arranged to, for each CSP variable-parameter pair (i.e. V2-P4, V3-P1, V4-P2 and V5-P3 respectively), derive a set of possible values that are compatible with the set of constraints c1, c2, c3, c4, c5, c6, c7 and c8.

Moreover, the user interface module 310 is arranged to receive a user-generated input (e.g. via the input means 320) defining at least one parameter P1, P2, P3 and/or P4 as committed to a respective value of the set of possible values for the parameter in question. Additionally, the user interface module 310 is arranged to cause presentation (e.g. via the output means 325) of ranges of possible parameter values compatible with the at least one committed parameter P1, P2, P3 and/or P4.

In the example shown in FIG. 4a, we initially assume that a first parameter P1 has the possible values 1, 2 and 5, a second parameter P2 has the possible values 1, 2 and 3, a third parameter P3 has the possible values 1, 2, 3 and 4, and a fourth parameter P4 has the possible values 0, 1, 2 and 3 respectively. We further assume that the user wishes that the first parameter P1 be 1. Therefore, he/she enters a corresponding command (e.g. via the input means 320), and thus defines the first parameter P1 to the value=1 as illustrated in FIG. 4b.

In response thereto, the configuration engine 210 is preferably arranged to calculate an updated optimal solution $S_{opt}$ to the CSP 120, i.e. based on the first parameter P1 being committed to the value=1.

The CAD interface 130, in turn, is arranged to assign an updated dimension {d} in the CAD model 110 for each CSP variable-dimension pair V2-P4, V3-P1, V4-P2 and V5-P3 respectively. The assigned updated dimension {d} corresponds to the value assigned to a CSP variable V1, V2, V3, V4, V5, V6, V7, and V8 in the updated optimal solution $S_{opt}$. The CAD interface 130 also causes presentation of updated allocated parameter values corresponding to the values assigned to the CSP variables V1, V2, V3, V4, V5, V6, V7 and V8 in the updated optimal solution $S_{opt}$. Additionally, The CAD interface 130 causes presentation of ranges of possible parameter values that are compatible with the set of constraints c1, c2, c3, c4, c5, c6, c7 and c8 relative to the at least one committed parameter P1=1. In this example, the commitment of the first parameter P1 to the value 1 leads to a restriction of the second parameter P2 to the possible values 1 and 3, a restriction of the third parameter P3 to the possible values 1 and 4, and restriction of the fourth parameter P4 to the possible value 3 as shown in FIG. 4b.

FIGS. 5a, 5b, 6a and 6b exemplify how the proposed solution can be applied to an actual CAD model of a conveyor. Let us assume that one constraint is that a total height $h_{TOT}$ of the conveyor equals a height of the frame $h_f$ plus a height of a leg beam plus a height of a foot $h_{foot}$.

All four drawings in FIGS. 5a, 5b, 6a and 6b are created by a CAD system.

Figure 5A:
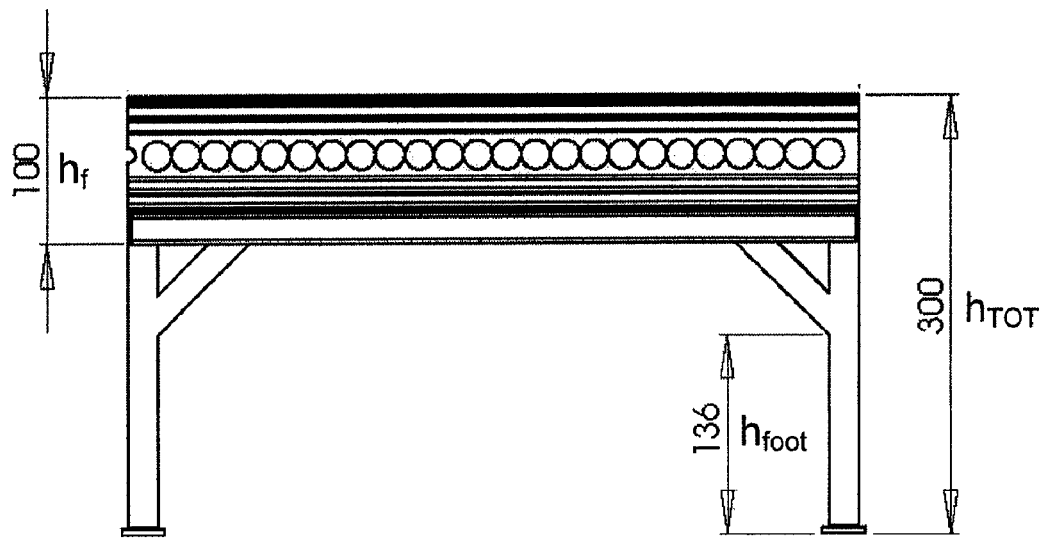
FIGS. 5a-b, 6a-b exemplify how the proposed solution can be applied to a specific CAD model.
Figure 5B:
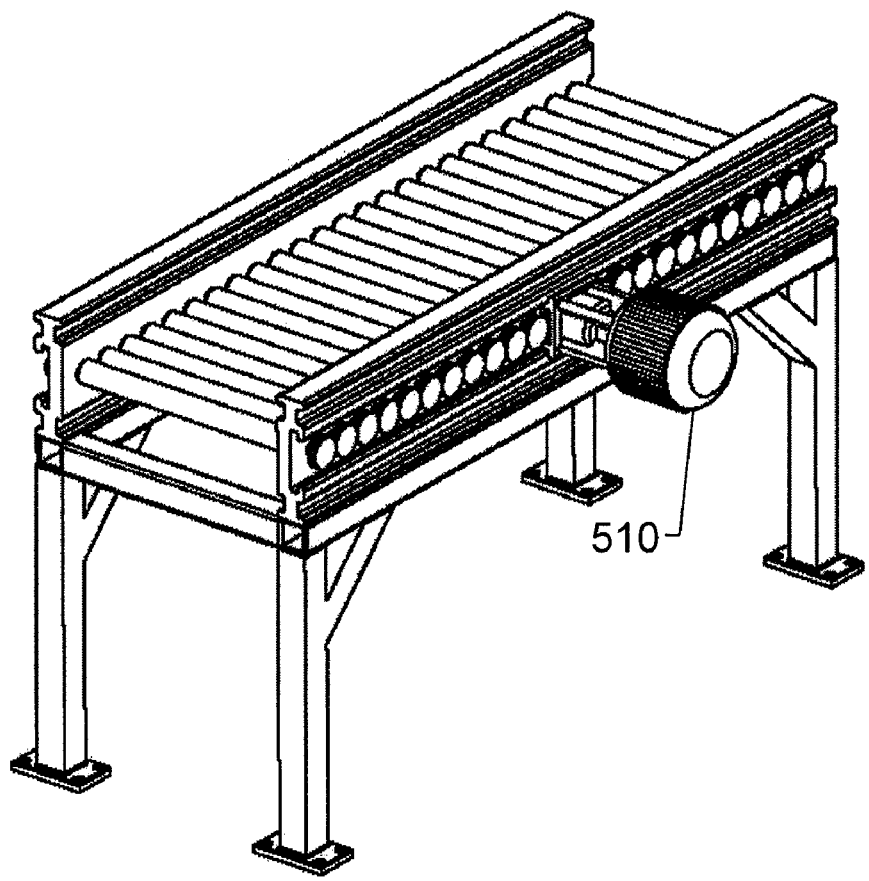

FIG. 5a shows a first example of dimensions wherein the total height $h_{TOT}$=300, the height of the frame $h_f$=100 and the height of the foot $h_{foot}$=136. FIG. 5b shows a perspective view of the conveyor in FIG. 5a. In FIG. 5b, the conveyor's electric motor 510 is also visible.

Figure 6A:
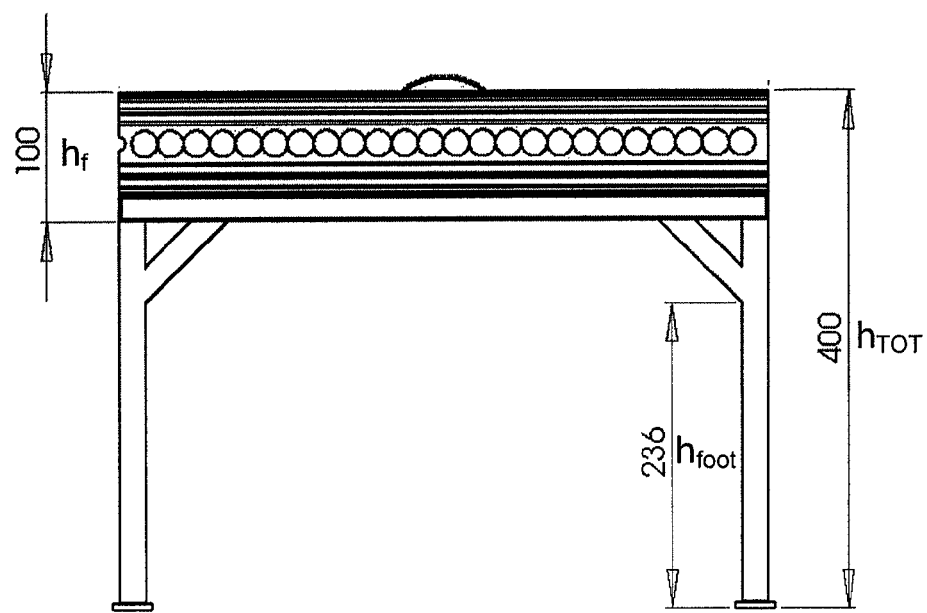
Figure 6B:
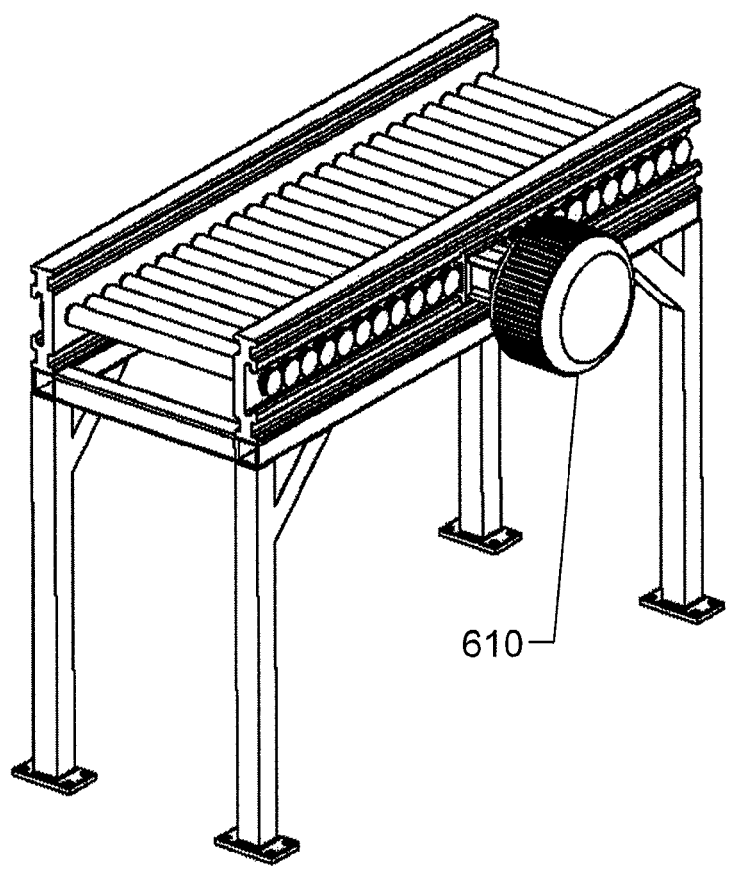

FIG. 6a shows a customized version of the conveyor, where the total height $h_{TOT}$=400, the height of the frame $h_F$=100 and the height of the foot $h_{foot}$=236. FIG. 6b shows a perspective view of the customized conveyor of FIG. 6a, where the conveyor's electric motor has been replaced by a somewhat larger motor 610.

In this example, there is a first dependency, which means that the total height $h_{TOT}$ is equal to the height of the foot $h_{foot}$ plus the height of the frame $h_F$ (here fixed to 100) plus a constant distance, e.g. corresponding to the leg beam.

A second dependency is that the large motor 610 must be used if the total height $h_{TOT}$ is greater than 350.

Using the proposed CSP based configurator; this kind of customization may be defined by two constraints explicitly capturing said first and second dependencies. Consequently, the designer is able to make trade-offs between different values of the three design choices represented by the total height $h_{TOT}$, the height of the foot $h_{foot}$ and the motor size.

In addition to using the configurator according to the invention interactively in the CAD system, it also possible and useful to apply the configurator in order to customize a design based on parameter values given up-front, e.g. when a complete specification of customer requirements is provided, or has been created by a different system.

Figure 7:
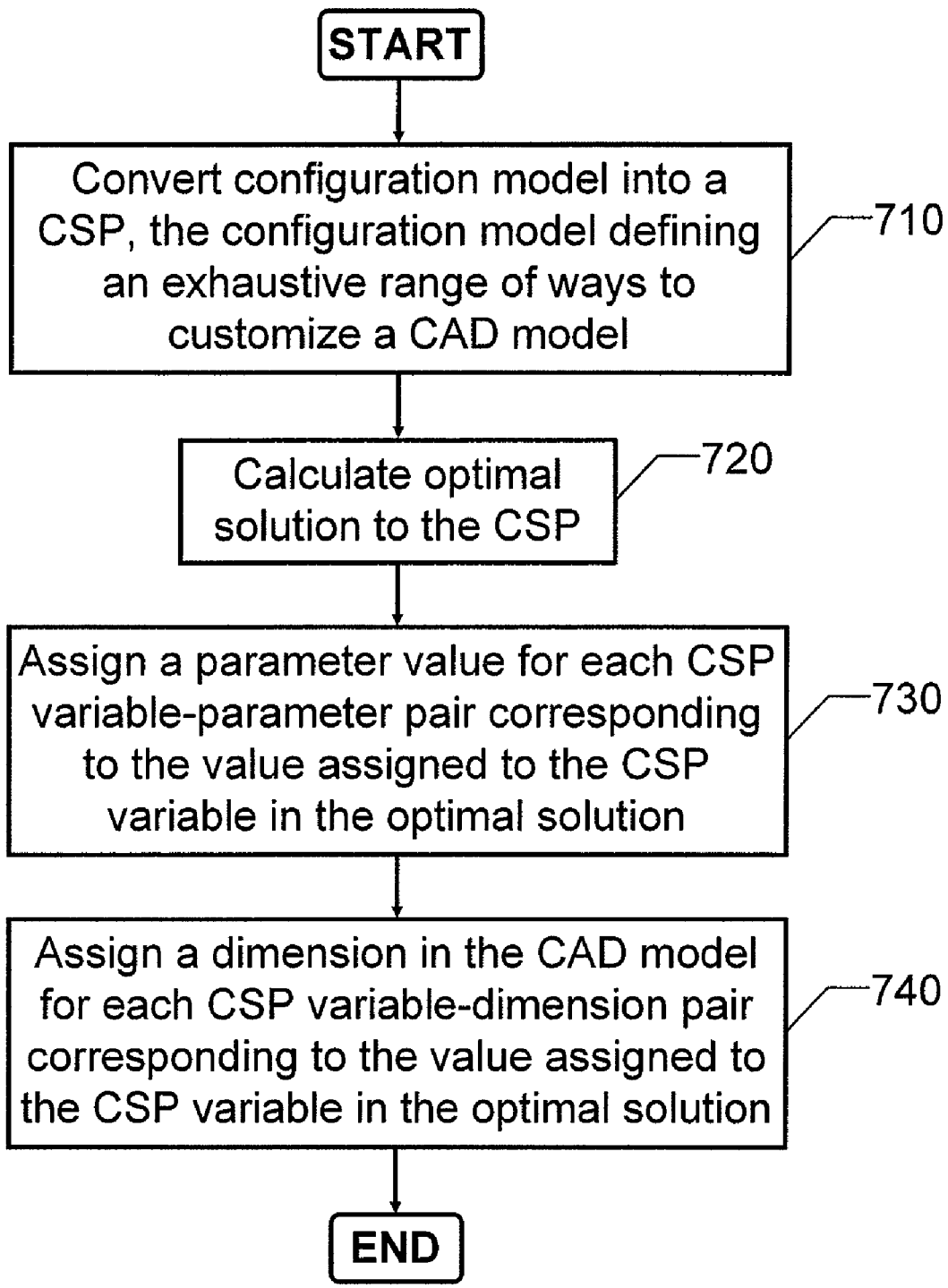
FIG. 7 illustrates, by means of a flow diagram, a general method of controlling a computer apparatus according to the invention.

To sum up, the general method of controlling a computer apparatus to customize a CAD model according to the invention will now be described with reference to the flow diagram in FIG. 7.

An initial step 710 converts a configuration model into a CSP. We here presume that the CAD model represents a mechanical design of an artifact having a set of parts with respective dimensions, and that the configuration model defines an exhaustive range of ways to customize the CAD model by changing a subset of said dimensions. Moreover, as described above, the resulting CSP represents all possible customizations defined by the configuration model. Specifically, the CSP is defined by: (a) set of integer variables, wherein each variable may attain a finite number of different values, and (b) a set of constraints restricting which variable values that are simultaneously possible for the variables in the set of variables. Step 710 also produces a set of CSP variable-dimension pairs and a set of CSP variable-parameter pairs based on the configuration model.

A step 720, subsequent to step 710, calculates a solution to the CSP, which solution is optimal with respect to a value assigned to each variable in the CSP relative to a predefined optimizing criterion.

Thereafter, a step 730 assigns a parameter value for each CSP variable-parameter pair. The allocated parameter value here corresponds to the value assigned to the CSP variable in the optimal solution generated in step 720.

Finally, a step 740 assigns a dimension in the CAD model for each CSP variable-dimension pair, where the assigned dimension corresponds to a value assigned to the CSP variable in the optimal solution generated in step 720.

Naturally, as discussed previously, steps 720 through 740 may very well be repeated, for instance in response to various user inputs causing step 720 to be updated.

Figure 8:
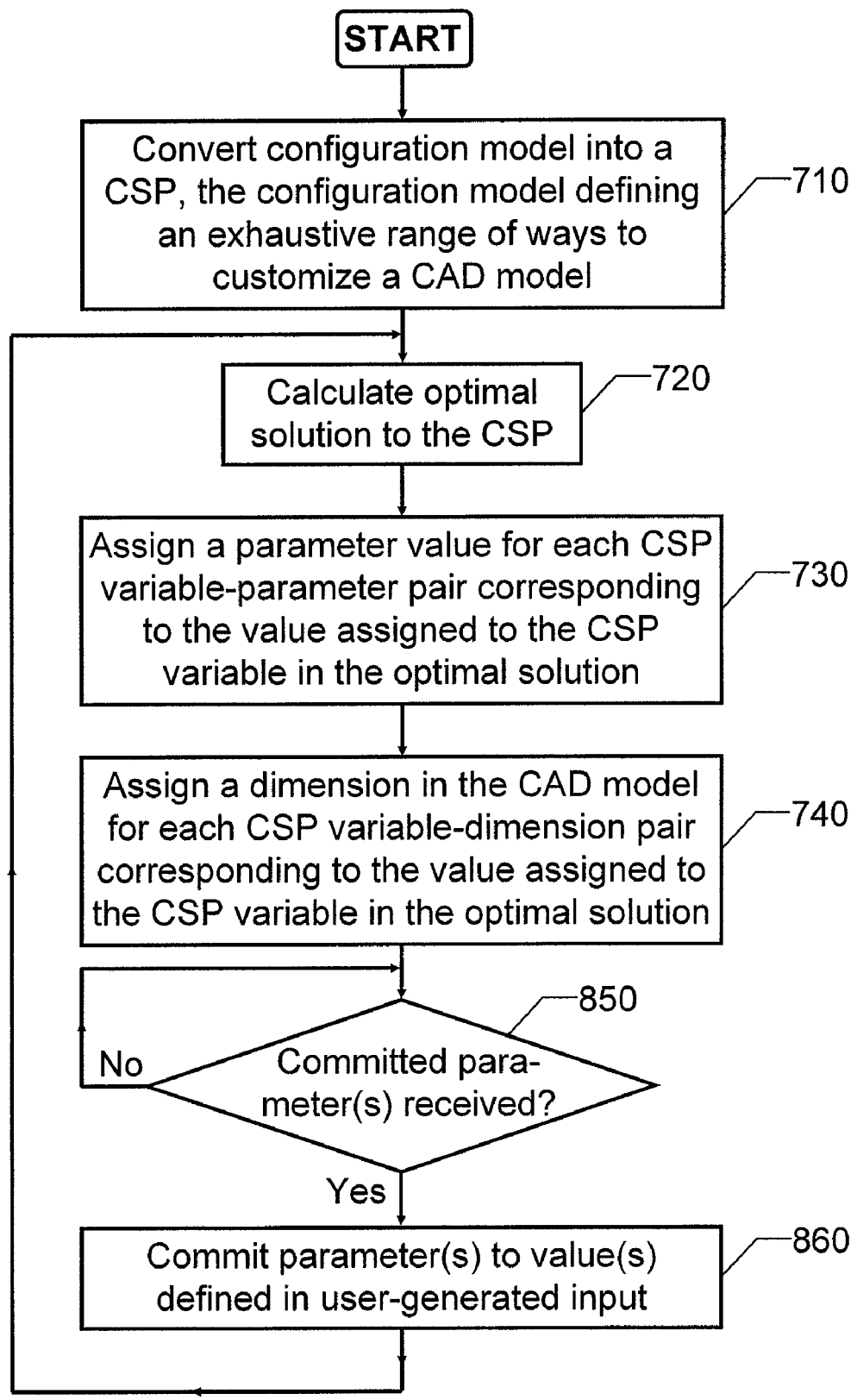
FIG. 8 shows a flow diagram illustrating a method according to one embodiment of the invention.

FIG. 8 shows a flow diagram illustrates one such example, namely when a user enters a command that causes one or more parameters to be committed to a respective value.

Here, steps 710 to 740 are identical to those described above with reference to FIG. 7. A step 850 subsequent to step 740 investigates whether or not a user-generated command has been received which defines at least one parameter to a particular value. If so, a step 860 follows. Otherwise, the procedure loops back and stays in step 850.

Step 860 commits each variable to the respective value defined in the user-generated command received in step 850. Thereafter, the procedure loops back to step 720, wherein an updated optimal solution to the CSP is calculated.

All of the steps, as well as any sub-sequence of steps, described with reference to FIGS. 7 and 8, above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the procedure according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc), an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant procedures.

The invention claimed is:

1. A system for customizing a CAD model representing a mechanical design of an artifact comprising a set of parts with respective dimensions, a configuration model defining an exhaustive range of ways to customize the CAD model by changing a subset of said dimensions, the system including components controlled by a programmed computer, the components comprising:
    a model translation module arranged to convert the configuration model into:
        (i) a constraint satisfaction problem (CSP) representing all possible customizations defined by the configuration model, the CSP being defined by: (a) a set of integer variables, wherein each variable may attain a finite number of different values, and (b) a set of constraints restricting which variable values that are simultaneously possible for the variables in the set of variables based on a particular variable in the set of variables being assigned a particular value from the finite number of different values,
        (ii) a set of CSP variable-dimension pairs, and
        (iii) a set of CSP variable-parameter pairs,
    a configuration engine arranged to:
        calculate a solution to the CSP, the calculated solution being optimal with respect to a value assigned to each variable in the CSP relative to a predefined optimizing criterion, and
        assign a parameter value for each CSP variable-parameter pair, the assigned parameter value corresponding to the value assigned to the CSP variable in the optimal solution, and a CAD interface arranged to assign a dimension in the CAD model for each CSP variable-dimension pair, said assigned dimension corresponding to a value assigned to the CSP variable in the optimal solution.

2. The system according to claim 1, wherein the configuration engine is further arranged to, for each CSP variable-parameter pair, derive a set of possible values compatible with the set of constraints.

3. The system according to claim 2, further comprising a user interface module arranged to:
   receive a user-generated input defining a parameter as committed to a particular value of the set of possible values for the parameter, and
   cause presentation of ranges of possible parameter values compatible with the at least one committed parameter.

4. The system according to claim 3, wherein
   the configuration engine is further arranged to calculate an updated optimal solution to the CSP based on at least one committed parameter, and in response thereto
   the CAD interface is arranged to:
      assign an updated dimension in the CAD model for each CSP variable-dimension pair, said assigned updated dimension corresponding to the value assigned to a CSP variable in the updated optimal solution,
      cause presentation of updated allocated parameter values corresponding to the values assigned to the CSP variables in the updated optimal solution, and
      cause presentation of ranges of possible parameter values compatible with the set of constraints relative to the at least one committed parameter.

5. The system according to claim 4, wherein at least one part in the CAD model is replaceable with a part from a respective set of at least one alternative part, the replaceable part corresponding to a CSP variable having a first integer value, and each of the at least one alternative part corresponding to a respective second integer value of the CSP variable, the configuration engine being arranged to assign the second integer value of the CSP variable via the optimal solution.

6. The system according to claim 4, wherein the model translation module is further arranged to convert the configuration model into a hierarchy having nodes, the nodes containing said CSP variables and parts of the CAD model, at least one node defining at least one of its CSP variables as a state variable whose value may be either one or zero; and the configuration engine is further arranged to, for each node,
   investigate if the state variable exists, and
   if the value assigned to the state variable in the optimal solution is equal to zero, cause suppression of the parameters associated with CSP variables in the node and associated with CSP variables in any nodes descending there from, each node associated with a suppressed CSP variable being defined as a suppressed node, and the CAD interface is further arranged to for each node,
   investigate if the state variable exists, and
   if the value assigned to the state variable in the optimal solution is equal to zero, cause suppression of the CAD parts in the node and any CAD parts descending from this node.

7. The system according to claim 6, wherein the CAD interface is arranged to:
   update the CAD model based on the suppressed nodes,
   cause presentation of the updated CAD model, and
   cause presentation of ranges of possible parameter values compatible with the set of constraints relative to the updated CAD model.

8. A method of customizing a CAD model representing a mechanical design of an artifact comprising a set of parts with respective dimensions, a configuration model defining an exhaustive range of ways to customize the CAD model by changing a subset of said dimensions, the method comprising:
   converting the configuration model into: (i) a constraint satisfaction problem (CSP) representing all possible customizations defined by the configuration model, the CSP being defined by: (a) a set of integer variables, wherein each variable may attain a finite number of different values, and (b) a set of constraints restricting which variable values that are simultaneously possible for the variables in the set of variables based on a particular variable in the set of variables being assigned a particular value from the finite number of different values, (ii) a set of CSP variable-dimension pairs, and (iii) a set of CSP variable-parameter pairs,
   calculating a solution to the CSP, the calculated solution being optimal with respect to a value assigned to each variable in the CSP relative to a predefined optimizing criterion, and
   assigning a parameter value for each CSP variable-parameter pair, the assigned parameter value corresponding to the value assigned to the CSP variable in the optimal solution, and
   assigning a dimension in the CAD model for each CSP variable-dimension pair, said assigned dimension corresponding to a value assigned to the CSP variable in the optimal solution.

9. The method according to claim 8, further comprising deriving, for each CSP variable-parameter pair, a set of possible values compatible with the set of constraints.

10. The method according to claim 9, further comprising:
    checking if a user-generated input has been received which input defines a parameter as committed to a particular value of the set of possible values for the parameter, and in response to such an input
    causing presentation of ranges of possible parameter values compatible with the at least one committed parameter.

11. The method according to claim 10, further comprising:
    calculating an updated optimal solution to the CSP based on at least one committed parameter,
    assigning an updated dimension in the CAD model for each CSP variable-dimension pair, said assigned updated dimension corresponding to the value assigned to a CSP variable in the updated optimal solution,
    causing presentation of updated allocated parameter values corresponding to the values assigned to the CSP variables in the updated optimal solution, and
    causing presentation of ranges of possible parameter values compatible with the set of constraints relative to the at least one committed parameter.

12. The method according to claim 11, wherein at least one part in the CAD model is replaceable with a part from a respective set of at least one alternative part, the replaceable part corresponding to a CSP variable having a first integer value, and each of the at least one alternative part corresponding to a respective second integer value of the CSP variable, the method further comprising assigning the second integer value of the CSP variable via the optimal solution.

13. The method according to claim 11, further comprising:
    converting the configuration model into a hierarchy having nodes, the nodes containing said CSP variables and parts of the CAD model, and at least one node defining at least one of its CSP variables as a state variable whose value may be either one or zero;

investigating, for each node, if the state variable exists, and if the value assigned to the state variable in the optimal solution is equal to zero, causing suppression of the parameters associated with CSP variables in the node and associated with CSP variables in any nodes descending there from, defining each node which is associated with a suppressed CSP variable as suppressed, investigating, for each node, if the state variable exists, and if the value assigned to the state variable in the optimal solution is equal to zero, causing suppression of the CAD parts in the node and any CAD parts descending from this node.

14. The method according to claim 13, comprising:

updating the CAD model based on the suppressed nodes, causing presentation of the updated CAD model, and causing presentation of ranges of possible parameter values compatible with the set of constraints relative to the updated CAD model.

15. A computer program product for customizing a CAD model representing a mechanical design of an artifact comprising a set of parts with respective dimensions, a configuration model defining an exhaustive range of ways to customize the CAD model by changing a subset of said dimensions, the computer program product comprising at least one computer-readable storage medium having computer-readable program code portions stored therein, the computer-readable program code portions comprising:

a first executable portion for converting the configuration model into: (i) a constraint satisfaction problem (CSP) representing all possible customizations defined by the configuration model, the CSP being defined by: (a) a set of integer variables, wherein each variable may attain a finite number of different values, and (b) a set of constraints restricting which variable values that are simultaneously possible for the variables in the set of variables based on a particular variable in the set of variables being assigned a particular value from the finite number of different values, (ii) a set of CSP variable-dimension pairs, and (iii) a set of CSP variable-parameter pairs, a second executable portion for calculating a solution to the CSP, the calculated solution being optimal with respect to a value assigned to each variable in the CSP relative to a pre-defined optimizing criterion, and a third executable portion for assigning a parameter value for each CSP variable-parameter pair, the assigned parameter value corresponding to the value assigned to the CSP variable in the optimal solution, and a fourth executable portion for assigning a dimension in the CAD model for each CSP variable-dimension pair, said assigned dimension corresponding to a value assigned to the CSP variable in the optimal solution.

16. The computer program product according to claim 15, further comprising a fifth executable portion for deriving, for each CSP variable-parameter pair, a set of possible values compatible with the set of constraints.

17. The computer program product according to claim 16, further comprising:

a sixth executable portion for checking if a user-generated input has been received which input defines a parameter as committed to a particular value of the set of possible values for the parameter, and in response to such an input, and a seventh executable portion for causing presentation of ranges of possible parameter values compatible with the at least one committed parameter.

18. The computer program product according to claim 17, further comprising:

an eighth executable portion for calculating an updated optimal solution to the CSP based on at least one committed parameter, a ninth executable portion for assigning an updated dimension in the CAD model for each CSP variable-dimension pair, said assigned updated dimension corresponding to the value assigned to a CSP variable in the updated optimal solution, a tenth executable portion for causing presentation of updated allocated parameter values corresponding to the values assigned to the CSP variables in the updated optimal solution, and an eleventh executable portion for causing presentation of ranges of possible parameter values compatible with the set of constraints relative to the at least one committed parameter.

19. The computer program product according to claim 18, wherein at least one part in the CAD model is replaceable with a part from a respective set of at least one alternative part, the replaceable part corresponding to a CSP variable having a first integer value, and each of the at least one alternative part corresponding to a respective second integer value of the CSP variable, the computer program product further comprising a twelfth executable portion for assigning the second integer value of the CSP variable via the optimal solution.

20. The computer program product according to claim 18, further comprising:

a twelfth executable portion for converting the configuration model into a hierarchy having nodes, the nodes containing said CSP variables and parts of the CAD model, and at least one node defining at least one of its CSP variables as a state variable whose value may be either one or zero;

a thirteenth executable portion for investigating, for each node, if the state variable exists, and if the value assigned to the state variable in the optimal solution is equal to zero, a fourteenth executable portion for causing suppression of the parameters associated with CSP variables in the node and associated with CSP variables in any nodes descending there from, defining each node which is associated with a suppressed CSP variable as suppressed, a fifteenth executable portion for investigating, for each node, if the state variable exists, and if the value assigned to the state variable in the optimal solution is equal to zero, a sixteenth executable portion for causing suppression of the CAD parts in the node and any CAD parts descending from this node.

21. The computer program product according to claim 20, comprising:

a seventeenth executable portion for updating the CAD model based on the suppressed nodes, an eighteenth executable portion for causing presentation of the updated CAD model, and a nineteenth executable portion for causing presentation of ranges of possible parameter values compatible with the set of constraints relative to the updated CAD model.

* * * * *